US012568083B2

(12) United States Patent (10) Patent No.: US 12,568,083 B2
Gupta (45) Date of Patent: Mar. 3, 2026

(54) DEVICE SOCIAL MEDIA INTEGRATION WITH CLOUD SOLUTIONS FOR ISSUE RESOLUTIONS

(71) Applicant: American Megatrends International, LLC, Duluth, GA (US)

(72) Inventor: Chitrak Gupta, Johns Creek, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 63 days.

(21) Appl. No.: 18/672,165

(22) Filed: May 23, 2024

(65) Prior Publication Data

US 2025/0365283 A1     Nov. 27, 2025

(51) Int. Cl.
*H04L 9/40* (2022.01)
*G06Q 50/00* (2024.01)

(52) U.S. Cl.
CPC ......... *H04L 63/0876* (2013.01); *G06Q 50/01* (2013.01); *H04L 63/105* (2013.01)

(58) Field of Classification Search
CPC ............... H04L 63/0876; H04L 63/105; H04L 63/102; H04L 63/104; G06Q 50/01
See application file for complete search history.

(56) References Cited

U.S. PATENT DOCUMENTS

| 2016/0088021 A1* | 3/2016 | Jayanti Venkata .... | H04L 63/104 |
| | | | 726/1 |
| 2016/0134624 A1* | 5/2016 | Jacobson ................ | H04W 4/02 |
| | | | 726/4 |
| 2016/0380988 A1* | 12/2016 | Goel ...................... | H04W 12/06 |
| | | | 726/7 |
| 2017/0272468 A1* | 9/2017 | Chechani .............. | H04L 63/102 |
| 2022/0038448 A1* | 2/2022 | DeFilippo .............. | H04L 67/12 |
| 2022/0272117 A1* | 8/2022 | Maheve .............. | H04L 63/1416 |
| 2023/0300138 A1* | 9/2023 | Nainar ................ | H04L 63/0435 |
| | | | 726/4 |

* cited by examiner

*Primary Examiner* — Javier O Guzman
(74) *Attorney, Agent, or Firm* — Tim Tingkang Xia, ESQ.; TROUTMAN PEPPER LOCKE LLP

(57) ABSTRACT

A computer system receives a request from a device to join a device social network supported by an enterprise device social media cloud. The request comprises a user packet that includes a network social name, enterprise credentials of the device, and device information metadata. The computer system validates the user packet. When the validation is successful, the computer system calls a directory service to create a directory service user entry corresponding to the device in the directory service. When the creation of the directory service user entry is successful, the computer system creates a device social network user corresponding to the device in the enterprise device social media cloud.

20 Claims, 8 Drawing Sheets

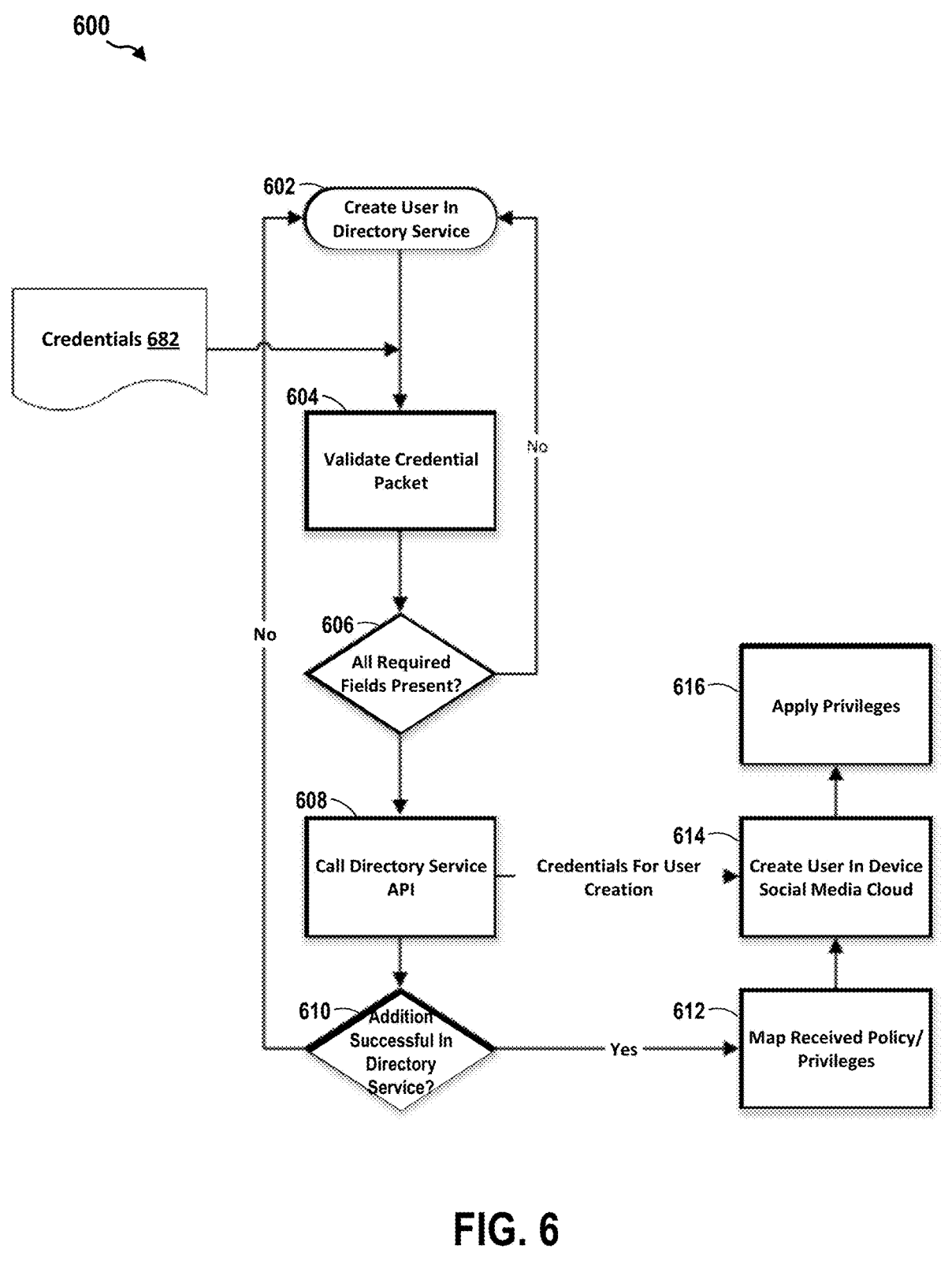

600

602 — Create User In Directory Service

Credentials 682

604 — Validate Credential Packet

606 — All Required Fields Present?

No

608 — Call Directory Service API

610 — Addition Successful In Directory Service?

No

Credentials For User Creation

Yes

612 — Map Received Policy/ Privileges

614 — Create User In Device Social Media Cloud

616 — Apply Privileges

FIG. 6

DEVICE SOCIAL MEDIA INTEGRATION WITH CLOUD SOLUTIONS FOR ISSUE RESOLUTIONS

BACKGROUND

Field

The present disclosure relates generally to computer systems, and more particularly, to techniques integrating an enterprise device social media cloud and network with an enterprise's directory services to enable devices to communicate and collaborate while adhering to the enterprise's established security policies and access controls.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v. 2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, SNMP traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

The BMC may be considered as an embedded-system device or a service processor. A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and a computer system are provided. The computer system receives a request from a device to join a device social network supported by an enterprise device social media cloud. The request comprises a user packet that includes a network social name, enterprise credentials of the device, and device information metadata. The computer system validates the user packet. When the validation is successful, the computer system calls a directory service to create a directory service user entry corresponding to the device in the directory service. When the creation of the directory service user entry is successful, the computer system creates a device social network user corresponding to the device in the enterprise device social media cloud.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a flowchart of a process for adding a new device as a user to the enterprise device social media cloud and network.

DETAILED DESCRIPTION

Figure 1:
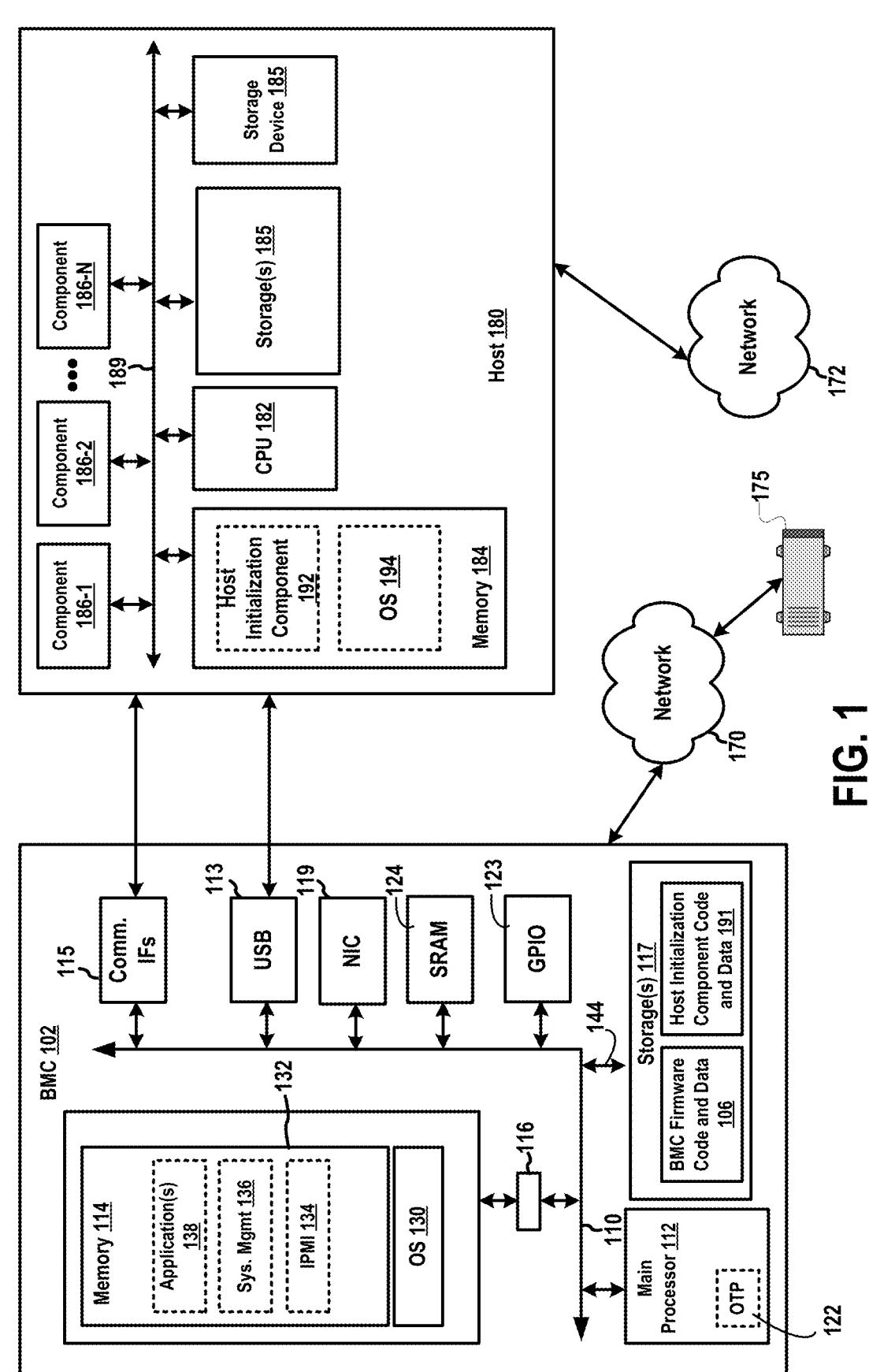
FIG. 1 is a diagram illustrating a computer system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as elements). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a processing system that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating a computer system 100. In this example, the computer system includes, among other devices, a baseboard management controller (BMC) 102 and a host computer 180. The BMC 102 has, among other components, a main processor 112, a memory 114 (e.g., a dynamic random access memory (DRAM)), a memory driver 116, storage(s) 117, a network interface card 119, a USB interface 113 (i.e., Universal Serial Bus), other communication interfaces 115, a SRAM 124 (i.e., static RAM), and a GPIO interface 123 (i.e., general purpose input/output interface). Further, the main processing unit 112 contains an OTP memory 122 (i.e., one time programmable memory).

The communication interfaces 115 may include a keyboard controller style (KCS), a server management interface chip (SMIC), a block transfer (BT) interface, a system management bus system interface (SSIF), and/or other suitable communication interface(s). Further, as described infra, the BMC 102 supports IPMI and provides an IPMI interface between the BMC 102 and the host computer 180. The IPMI interface may be implemented over one or more of the USB interface 113, the network interface card 119, and the communication interfaces 115.

In certain configurations, one or more of the above components may be implemented as a system-on-a-chip (SoC). For examples, the main processor 112, the memory 114, the memory driver 116, the storage(s) 117, the network interface card 119, the USB interface 113, and/or the communication interfaces 115 may be on the same chip. In addition, the memory 114, the main processor 112, the memory driver 116, the storage(s) 117, the communication interfaces 115, and/or the network interface card 119 may be in communication with each other through a communication channel 110 such as a bus architecture.

The BMC 102 may store BMC firmware code and data 106 in the storage(s) 117. The storage(s) 117 may utilize one or more non-volatile, non-transitory storage media. During a boot-up, the main processor 112 loads the BMC firmware code and data 106 into the memory 114. In particular, the BMC firmware code and data 106 can provide in the memory 114 a BMC OS 130 (i.e., operating system) and service components 132. The service components 132 include, among other components, IPMI services 134, a system management component 136, and application(s) 138. Further, the service components 132 may be implemented as a service stack. As such, the BMC firmware code and data 106 can provide an embedded system to the BMC 102.

The BMC 102 may be in communication with the host computer 180 through the USB interface 113, the network interface card 119, the communication interfaces 115, and/or the IPMI interface, etc.

The host computer 180 includes a host CPU 182, a host memory 184, storage device(s) 185, and component devices 186-1 to 186-N. The component devices 186-1 to 186-N can be any suitable type of hardware components that are installed on the host computer 180, including additional CPUs, memories, and storage devices. As a further example, the component devices 186-1 to 186-N can also include Peripheral Component Interconnect Express (PCIe) devices, a redundant array of independent disks (RAID) controller, and/or a network controller.

Further, the storage(s) 117 may store host initialization component code and data 191 for the host computer 180. After the host computer 180 is powered on, the host CPU 182 loads the initialization component code and data 191 from the storage(s) 117 though the communication interfaces 115 and the communication channel 110. The host initialization component code and data 191 contains an initialization component 192. The host CPU 182 executes the initialization component 192. In one example, the initialization component 192 is a basic input/output system (BIOS). In another example, the initialization component 192 implements a Unified Extensible Firmware Interface (UEFI). UEFI is defined in, for example, "Unified Extensible Firmware Interface Specification Version 2.6, dated January 2016," which is expressly incorporated by reference herein in their entirety. As such, the initialization component 192 may include one or more UEFI boot services.

The initialization component 192, among other things, performs hardware initialization during the booting process (power-on startup). For example, when the initialization component 192 is a BIOS, the initialization component 192 can perform a Power On System Test, or Power On Self Test, (POST). The POST is used to initialize the standard system components, such as system timers, system DMA (Direct Memory Access) controllers, system memory controllers, system I/O devices and video hardware (which are part of the component devices 186-1 to 186-N). As part of its initialization routine, the POST sets the default values for a table of interrupt vectors. These default values point to standard interrupt handlers in the memory 114 or a ROM. The POST also performs a reliability test to check that the system hardware, such as the memory and system timers, is functioning correctly. After system initialization and diagnostics, the POST surveys the system for firmware located on non-volatile memory on optional hardware cards (adapters) in the system. This is performed by scanning a specific address space for memory having a given signature. If the signature is found, the initialization component 192 then initializes the device on which it is located. When the initialization component 192 includes UEFI boot services, the initialization component 192 may also perform procedures similar to POST.

After the hardware initialization is performed, the initialization component 192 can read a bootstrap loader from a predetermined location from a boot device of the storage device(s) 185, usually a hard disk of the storage device(s) 185, into the host memory 184, and passes control to the bootstrap loader. The bootstrap loader then loads an OS 194 into the host memory 184. If the OS 194 is properly loaded into memory, the bootstrap loader passes control to it. Subsequently, the OS 194 initializes and operates. Further, on certain disk-less, or media-less, workstations, the adapter firmware located on a network interface card re-routes the pointers used to bootstrap the operating system to download the operating system from an attached network.

The service components 132 of the BMC 102 may manage the host computer 180 and is responsible for managing and monitoring the server vitals such as temperature and voltage levels. The service stack can also facilitate administrators to remotely access and manage the host computer 180. In particular, the BMC 102, via the IPMI services 134, may manage the host computer 180 in accordance with IPMI. The service components 132 may receive and send IPMI messages to the host computer 180 through the IPMI interface.

Further, the host computer 180 may be connected to a data network 172. In one example, the host computer 180 may be a computer system in a data center. Through the data network 172, the host computer 180 may exchange data with other computer systems in the data center or exchange data with machines on the Internet.

The BMC 102 may be in communication with a communication network 170 (e.g., a local area network (LAN)). In this example, the BMC 102 may be in communication with the communication network 170 through the network interface card 119. Further, the communication network 170 may be isolated from the data network 172 and may be out-of-band to the data network 172 and out-of-band to the host computer 180. In particular, communications of the BMC 102 through the communication network 170 do not pass through the OS 194 of the host computer 180. In certain configurations, the communication network 170 may not be connected to the Internet. In certain configurations, the communication network 170 may be in communication with the data network 172 and/or the Internet. In addition, through the communication network 170, a remote device 175 may communicate with the BMC 102. For example, the remote device 175 may send IPMI messages to the BMC 102 over the communication network 170.

Further, the storage(s) 117 is in communication with the communication channel 110 through a communication link 144.

Figure 2:
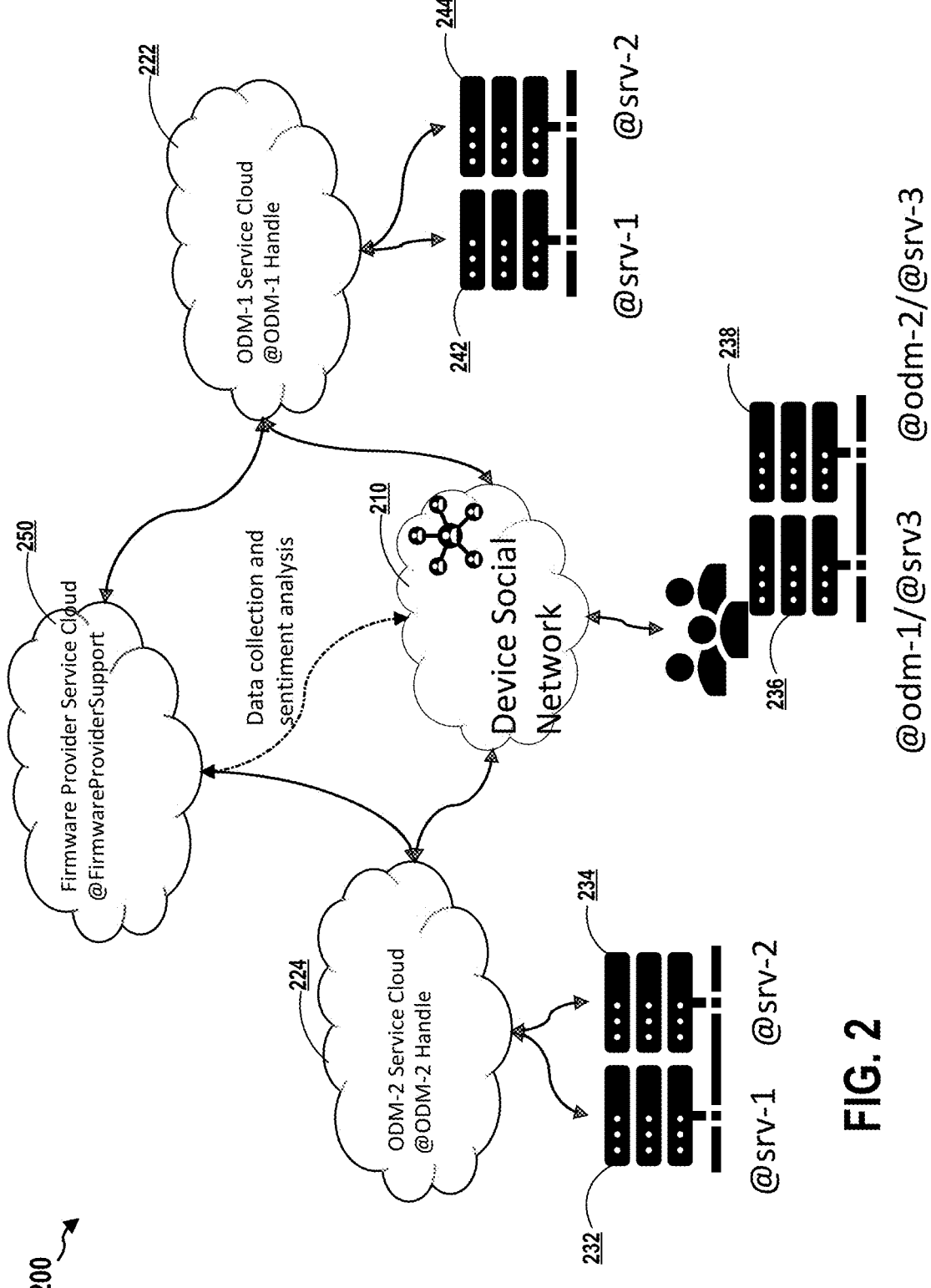
FIG. 2 is a diagram illustrating a device social network that enables self-diagnostic and healing of enterprise nodes.

FIG. 2 is a diagram 200 illustrating a device social network 210 that enables self-diagnostic and healing of enterprise nodes from the Firmware Provider service cloud 250, which is an on-premises or an off-premises cloud. The Firmware Provider service cloud 250 has a handle @FirmwareProviderSupport. In this example, an ODM-1 service cloud 222 and an ODM-2 service cloud 224 are each in communication with the Firmware Provider service cloud 250. The ODM-1 service cloud 222 has a handle @ODM-1 and the ODM-2 service cloud 224 has a handle @ODM-2.

Servers 232 and 234, having handles @odm-2/@srv-1 and @odm-2/@srv-2 respectively, are directly supported by the ODM-2 service cloud 224. Similarly, servers 242 and

244, with handles @odm-1/@srv-1 and @odm-1/@srv-2, are directly supported by the ODM-1 service cloud 222.

Additionally, servers 236 and 238 are located at a user's site and have handles @odm-1/@srv-3 and @odm-2/@srv-3, respectively. These servers 236 and 238 are in communication with the ODM-1 service cloud 222 and the ODM-2 service cloud 224 through the device social network 210.

The device social network 210 provides a unique paradigm where every node under the support of the Firmware Provider service cloud 250 is assigned a social media-like handle. The Firmware Provider service cloud 250 can reach any node using the format @<cloud-namespace>/@<node-name>. For instance, @ODM-2/@srv-1 is the identifier for the server 232 (i.e., srv-1) under ODM-2 support.

This setup allows for multi-level support, with ODM lever service clouds, e.g., the ODM-1 service cloud 222 and the ODM-2 service cloud 224, providing Level-1 support and escalating issues to the Firmware Provider service cloud 250 when necessary. The Firmware Provider service cloud 250 can push command resolutions, either in textual or script form, to the requesting nodes.

The device social network 210 is designed for devices and organizations, not humans. While humans can trigger messages using the device handles, they are not assigned personal handles. This approach minimizes human intervention and facilitates the development of AI models that can process machine-readable formatted data for automated diagnostics and healing of the systems.

The servers 232, 234, 236, 238, 242, and 244 each can be a host computer 180 that include a host CPU 182, a host memory 184, storage device(s) 185, a BMC 102, and component devices 186-1 to 186-N. The hierarchical structure of the device social network 210 allows for a complete tree structure of devices. For simplification, a single layer is used where each server handles its own devices, and not every device in the server requires a handle. The server acts as the master handle, providing information about any devices experiencing issues.

In the event of a problem, a server (e.g., server 236) can broadcast a message on the device social network 210, which is visible to all other servers and the ODM service clouds. The ODM service clouds can first attempt to resolve the issue using existing solutions or manual intervention by their IT teams. If the problem persists, they can escalate it to the Firmware Provider service cloud 250 by mentioning @FirmwareProviderSupport in the message.

The Firmware Provider service cloud 250 can then search for similar resolved issues and push the resolution back to the ODM service clouds, enabling them to resolve the issue independently. This approach improves efficiency, reduces costs for Firmware Provider, and provides quicker response times to the customer.

The device social network 210 serves as a data collection and broadcasting engine, allowing problems to be socialized across multiple ODMs. If ODM-1 encounters and resolves a problem, ODM-3 can benefit from the solution without needing to reach out to Firmware Provider for every similar issue. This sharing of information enhances the overall support experience for the customers.

In one scheme, the Firmware Provider service cloud 250 and the device social network may be implemented and deployed as an enterprise device social media cloud and network that provides a social media fabric within an enterprise. This enterprise device social media cloud is designed to be an internal solution that an enterprise can use on-premises to manage their own devices and support tickets, without relying on a third party off site service. The enterprise device social media cloud and network may be implemented by a private network without access to a public network.

The enterprise device social network can connect all information handling systems within the organization. It binds these systems into the fabric and assigns them social handles, enabling communication between the devices and with support handles. This allows for efficient management and troubleshooting of the devices within the enterprise.

The process of onboarding new systems and converting them to be part of the enterprise device social media cloud is a significant challenge. The solution should be able to integrate all devices and nodes, not just those from the Firmware Provider, into the enterprise device social network. This requires a unique method of onboarding that allows the devices to be identified and authenticated within the network.

To address this, the enterprise device social media cloud and network provides a framework that connects all information handling systems. This framework binds the devices into the fabric and creates social handles for each device, enabling them to communicate with each other and with support handles. The social handles are based on the device's unique identifiers, such as serial numbers or MAC addresses. Each device has a distinct identity within the network.

The enterprise device social media cloud and network also includes an IT administrator role, which allows for human intervention and management of the devices and support tickets. This human aspect is important for handling complex issues that may not be easily resolved through automated responses.

By providing this on-premises solution, the Firmware Provider empowers its customers to manage their own devices and support tickets internally, without relying on an external cloud for every issue. This not only improves the efficiency of the support process but also helps to reduce costs for both the Firmware Provider and its customers.

The enterprise device social media cloud and network provides a unique solution for device collaboration and troubleshooting within an enterprise. By creating a device social network, different devices can interact and share information for symbiotic troubleshooting. This allows devices to collaborate and resolve issues more efficiently, without always relying on external support.

One of the key features of the enterprise device social network and network is its ability to serve as a notification platform for communicating issues and resolutions. When a device encounters a problem, it can broadcast a message on the device social network, which is visible to other devices and support groups within the device social network. This allows for quick identification and resolution of issues, as other devices or service clouds may have encountered and resolved similar problems before.

In the event of a system crash, the enterprise device social media cloud can notify the internal support team, providing them with information about the issue. This can include details about the affected device, such as its handle, configuration, and any relevant log files. By having this information readily available, the support team can quickly diagnose and resolve the problem, minimizing downtime and interruption.

Furthermore, the enterprise device social media cloud can collect and store support data from various devices and service clouds. This data can be used by the enterprise device social media cloud to provide quicker resolutions to issues. By analyzing the support data, the Firmware Provider can identify common problems and develop solutions that can be shared across the device social network. This allows for faster resolution of issues.

Figure 3:
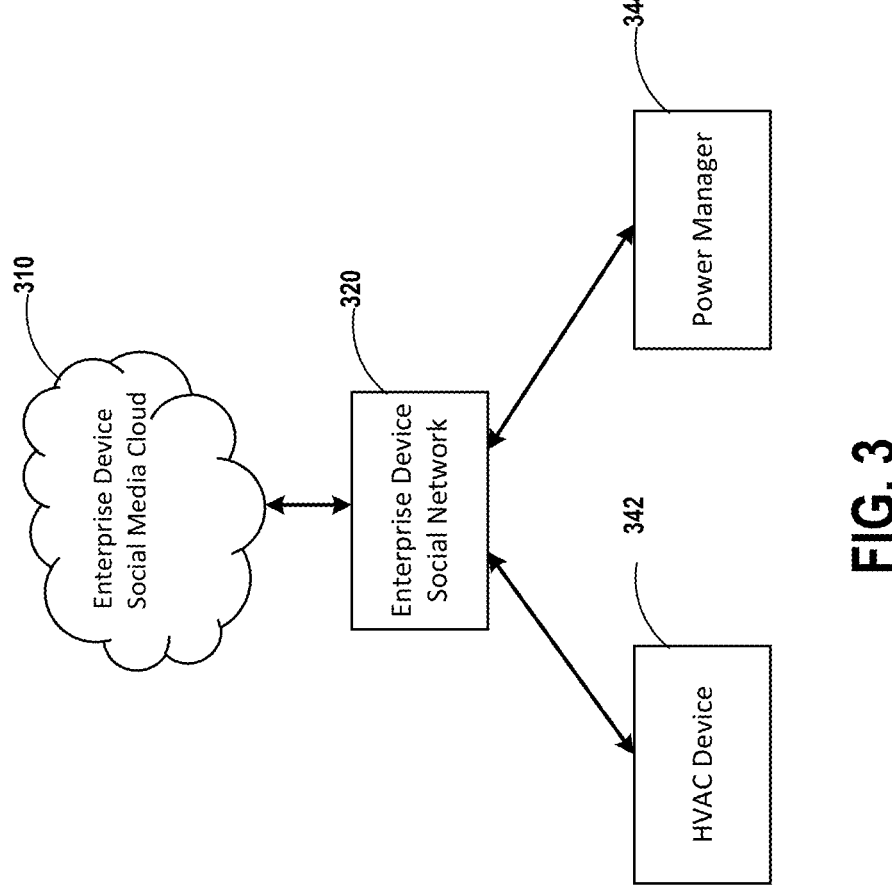
FIG. 3 is a diagram illustrating an example of device collaboration within an enterprise device social cloud and network.

FIG. 3 is a diagram 300 illustrating an example of device collaboration within an enterprise device social media cloud and network. In this scenario, two different types of devices, an HVAC device 342 and a power manager 344, are connected to an enterprise device social media cloud 310 through an enterprise social network 320.

The HVAC device 342 and the power manager 344 are assigned social handles, @HVAC and @PowerManager, respectively. These handles enable the devices to communicate with each other and share relevant information within the enterprise device social media cloud 310.

For instance, the HVAC device 342 can share its power consumption (#Power), ambient temperature (#AmbientTemperature), and average temperature (#AverageTemperature) with the power manager 344. This information allows the power manager 344 to monitor the power requirements of the HVAC device 342 and other intelligent devices connected to the enterprise device social media cloud 310. Additionally, the power manager 344 can check the health status of these devices and determine if any troubleshooting is required.

The enterprise device social media cloud 310 and network 320 enables various managed devices and elements within an enterprise to communicate and collaborate. This setup is not limited to servers and can include devices such as laptops, mobile phones, desktops, and other connected devices within the enterprise network.

The enterprise device social media cloud 310 is a private cloud, meaning that all the device handles are internal and cannot be accessed from outside the enterprise network. The devices in the enterprise device social network 320 is mapped to the enterprise's internal directory services.

Devices are assigned identifications and brought into the directory service, allowing them to assume roles and privileges similar to those of traditional users. Each device has its own unique identity within the directory service and can be managed and controlled according to the enterprise's policies. As such, each device becomes a user in the directory service. Each device is assigned a unique handle within the enterprise device social network 320 and is authenticated through the enterprise's directory services. This mapping of device handles to directory service accounts enables the application of existing enterprise policies and access controls to the devices within the enterprise device social network 320.

Enterprise nodes, which include computing devices, servers, storage, and networking nodes, can be part of both public (external) or private (internal) device social media fabric within the enterprise device social media cloud and network. The support for these nodes may be provided through both in-band and out-of-band agents. In-band support refers to communication and assistance provided through the device's primary data path, such as using a support agent running on a desktop or laptop. Out-of-band support, on the other hand, utilizes channels independent of the device's primary function, such as leveraging the BMC 102 on a server for event handling and communication with the internal device social network.

In-band support assists agents running on a device, similar to consumer products, and depends on the enterprise policy for external access. If the enterprise policies allow support tickets to flow out, they can still reach the Firmware Provider, but usually, many of these activities are restricted in-house.

Out-of-band support utilizes BMC-based event handling exposed to the internal enterprise device social fabric. As mentioned earlier, a BMC 102 on a server system is configured to handle communication with the enterprise device social network 320 and the enterprise device social media cloud 310. However, there may be other in-band support agents that collect information for devices without BMCs, such as HVACs, racks, desktops, or mobile devices. These devices require a support agent to be running on them.

Each enterprise node within the enterprise device social media cloud and network is marked with its respective service tag or serial number, which is used as its username. This approach provides identification and personifies each device within the overall enterprise directory service. The enterprise device social media cloud 310 can access the enterprise's directory services to integrate policies, restrictions, and accessibility control.

To facilitate communication and data broadcasting, enterprise nodes can utilize protocols such as IPMI or Redfish Eventing to interface with the device social network's API. These APIs provide a standardized way for devices to send and receive messages, enabling them to share status reports, request assistance, and broadcast information about issues and resolutions.

The data may be posted to multiple groups for discussion and troubleshooting, as enterprises often have different user groups with varying levels of access and restrictions. For example, there may be an HR group, an IT group, restricted CXO groups, or engineering groups. These groups can be based on device type, function, location, or any other criteria relevant to the enterprise. For example, an HVAC device 342 might share its operational data with a specific group dedicated to managing building infrastructure, while a server might broadcast its health status to a group responsible for IT infrastructure. The policies that define the kind of information that can be shared across the enterprise need to be bound in the enterprise device social media cloud and network solution.

In the example shown in FIG. 3, the HVAC device 342 and the power manager 344 are connected to the enterprise device social media cloud 310 through the enterprise device social network 320. These devices are assigned social handles, enabling them to communicate and share relevant information within the enterprise device social media cloud 310. This setup demonstrates the ability of the enterprise device social media cloud and network to facilitate collaboration and symbiotic troubleshooting among various managed devices and elements within an enterprise.

Figure 4:
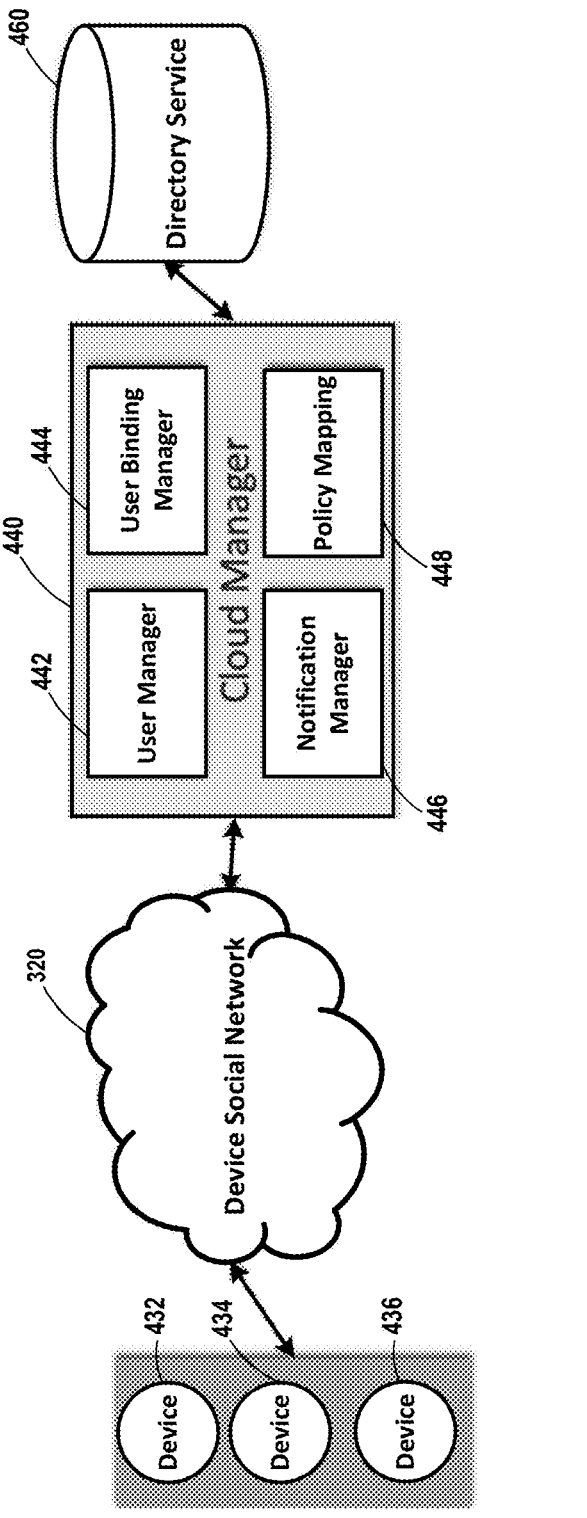
FIG. 4 is a diagram illustrating components of the enterprise device social media cloud and network.

FIG. 4 is a diagram 400 illustrating components of the enterprise device social media cloud and network. In this example, devices 432, 434, 436 are connected to the enterprise device social network 320. A cloud manager 440, which is part of the enterprise device social media cloud 310, is in the enterprise device social network 320. The cloud manager 440 includes a user manager 442, a user binding manager 444, a notification manager 446, and policy mapping component 448. Further, the cloud manager 440 can access a directory service 460. The cloud manager 440 and each of its subcomponents may be implemented by a computer system that has a hardware structure similar to that of the hose computer 180.

The cloud manager 440 is hosted as a plugin to the enterprise device social media cloud 310. In this example, devices 432, 434, and 436 are connected to the enterprise device social network 320. The devices 432, 434, 436 can be a host computer 180 or any suitable type of hardware components, such as an HVAC device 342 and a power manager 344. Whenever a new device is brought into the enterprise, it registers itself to the enterprise device social media cloud 310. During registration, the new device provides its requested username and associated metadata to the user manager 442. The metadata can include information about the device, such as its serial number, type, make, model, and other relevant details.

The user manager 442 manages the APIs related to binding the device social network users to the enterprise directory service 460. It receives requests from new devices to join the device social network 320 and, upon successful verification, creates corresponding entries in the directory service 460, associating each device with a unique identifier, such as a user name or serial number.

The directory service binding module, which is part of the user binding manager 444, establishes the connection with the enterprise directory services, binds users to the registered devices, brings policy mapping, and maintains the mapping between the device social network privileges, group memberships, and directory service domains. This allows the enterprise device social media cloud and network to apply the enterprise's existing policies and access controls to the devices within the device social network.

The notification manager 446 handles the routing of alerts. It decides if a notification is a public notification from an admin group or a localized notification (peer-to-peer) based on the user membership patterns. The notifications are delivered to the appropriate recipients based on their roles and responsibilities within the enterprise.

The directory service 460 can be an Active Directory service from Microsoft or an open-source LDAP server. The directory service 460 is responsible for managing user accounts, access controls, and policies within the enterprise. By integrating with the directory service 460, the enterprise device social media cloud and network can leverage the existing infrastructure and policies of the enterprise.

Figure 5:
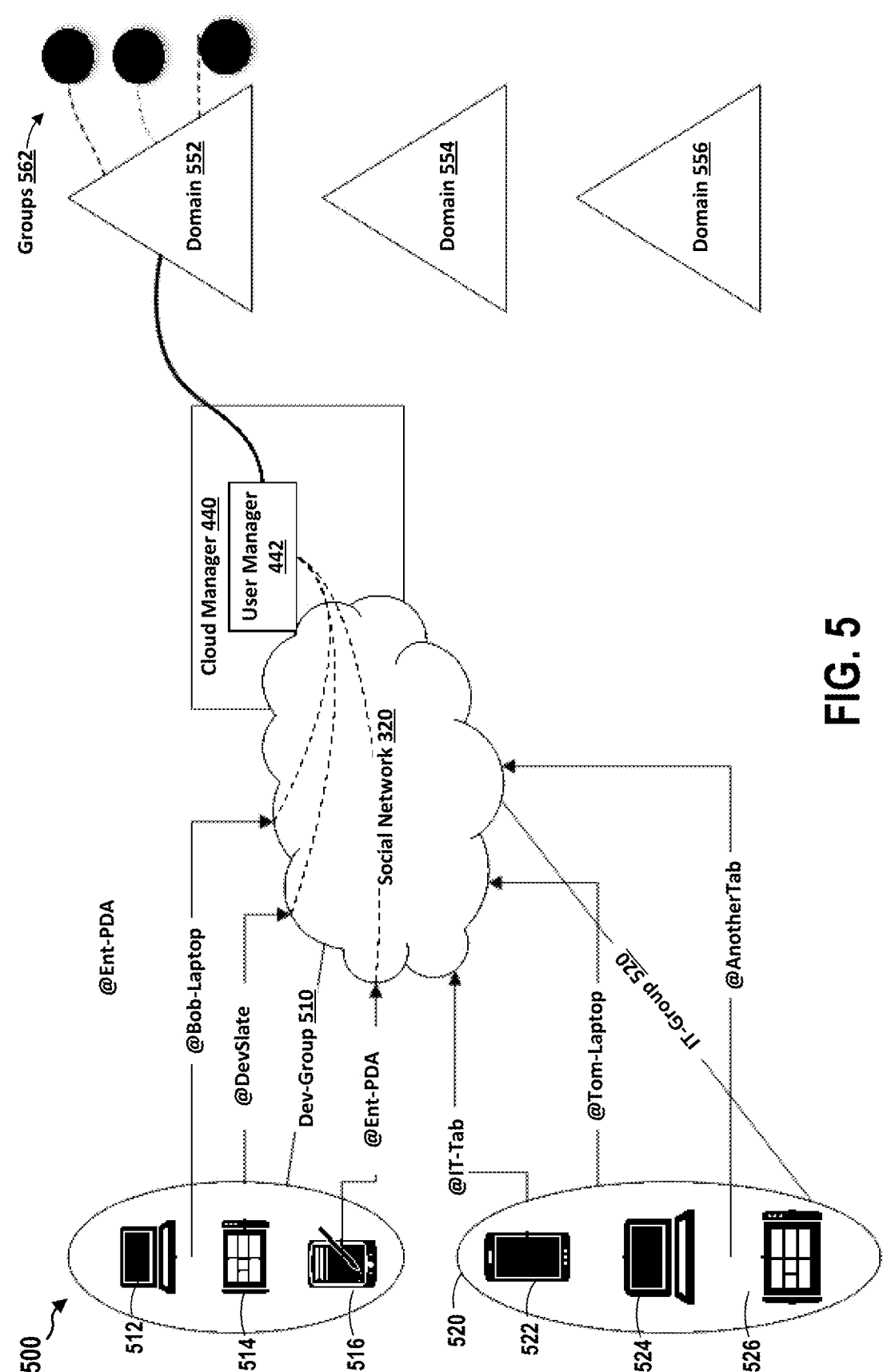
FIG. 5 is a diagram illustrating structure and interaction of various devices within an enterprise device social media cloud and network.

FIG. 5 is a diagram 500 illustrating structure and interaction of various devices within an enterprise device social media cloud and network. The diagram shows multiple devices organized into different groups, such as a development group 510 and an IT group 520.

The development group 510 includes a laptop 512 labeled as @Bob-Laptop, a slate device 514 labeled as @DevSlate, and a PDA 516 labeled as @Ent-PDA. Similarly, the IT group 520 includes a tablet 522 labeled as @IT-Tab, a laptop 524 labeled as @Tom-Laptop, and another tablet 526 labeled as @AnotherTab. These devices are connected to the enterprise device social network 320 and can communicate with each other and the enterprise device social media cloud 310.

Directory service domains 552, 554, and 556 are managed by the enterprise using different directory services (e.g., the directory service 460). These domains are used to create user groups and manage roles and policies within the enterprise. For example, the domain 552 may define groups 562. The cloud manager 440 can access the domains 552, 554, and 556. A directory services module, which is part of the user binding manager 444, creates a user binding between the directory service domains/users to the device social media user tags/handles.

Devices may register themselves to the enterprise device social media cloud 310 with a user packet including a network social name, enterprise credentials, and device information metadata. The network social name is a unique identifier assigned to the device within the enterprise device social network 320, such as "@BobLaptop" for a laptop belonging to an employee named Bob. The enterprise credentials are the authentication information required to verify the device's identity within the enterprise's directory service 460. The device information metadata contains details about the device, such as its serial number, type, make, model, and other relevant information.

When a device registers itself, the user packet is transmitted to the directory service 460. If the creation is successful in the directory service 460, the same user is created on the enterprise device social media cloud 310. For example, if a laptop with the network social name "@BobLaptop" successfully registers itself, a user entry "domain/bob-laptop@enterprise.com" is created in the directory service 460, and a corresponding user "@BobLaptop" is created in the enterprise device social media cloud 310.

User binding is the process of associating a device's social media user tag or handle with its corresponding entry in the enterprise's directory service. This is done by the user binding manager 444, which is a component of the cloud manager 440. The user binding manager 444 establishes a connection with the enterprise's directory service 460, creates user bindings, and maintains the mapping between the device social network privileges and the directory service domains.

Group membership is defined by the group binding process, which is handled by the user binding manager 444. The enterprise device social media cloud 310 hosts the groups, and users can subscribe to these groups provided the directory service domain controller grants them permission. Group binding is the process of associating devices with specific groups within the enterprise device social media cloud 310. Groups in the enterprise device social media cloud 310 have counterparts in the directory service 460. These groups are used to manage access controls, policies, and communication between devices. For example, there might be separate groups for IT devices, development devices, and management devices. The user binding manager 444 is responsible for defining group memberships based on the group binding process.

Group policies are created and managed in the enterprise's directory service 460. The enterprise device social media cloud 310 retrieves these policies from the directory service 460 and applies them to the corresponding groups within its own structure. The policies governing the devices in the enterprise device social media cloud 310 are consistent with the enterprise's existing policies.

For example, an "IT Devices" group may exist in the directory service 460 with specific access control policies. In that case, the enterprise device social media cloud 310 has a corresponding "IT Devices" group, and the policies defined in the directory service 460 will be applied to the devices within that group in the enterprise device social media cloud 310.

The entire management of each device, including its location, interactions, roles, and restrictions, is not controlled by the enterprise device social media cloud and network. Instead, the Firmware Provider provides binding services, and the policies are derived from the enterprise's existing directory services. This approach allows the enterprise device social media cloud and network to integrate with any enterprise without tampering with their existing policies or user management settings.

By treating devices as human-like entities and assigning them personified identifications, the enterprise device social media cloud and network enables devices to communicate and collaborate within the enterprise while adhering to the organization's established policies and access controls.

FIG. 6 is a flowchart 600 of a process for adding a new device as a user to the enterprise device social media cloud and network. The enterprise device social media cloud and network uses the enterprise's existing directory services 460 to manage devices and support tickets within the enterprise. Each device is treated as a user in the directory service 460, with its own unique identity and associated policies.

In operation 602, the enterprise device social media cloud 310 operates to create a user in the directory service 460. This operation is triggered when the device, such as the laptop 512 or the HVAC device 342, registers itself to the enterprise device social media cloud 310. The device provides, to the enterprise device social media cloud 310, its credentials 682, which include a network social name, enterprise credentials, and device information metadata.

In operation 604, the enterprise device social media cloud 310 validates the credential packet provided by the device. In operation 606, this validation process checks if all required fields are present in the credential packet. If any required fields are missing, the process returns to operation 602, where the user creation process is restarted.

If all required fields are present, the process moves to operation 608, where the enterprise device social media cloud 310 calls a directory service API of the directory service 460. This API call is made to create a user entry in the directory service 460 corresponding to the device. The credentials for user creation are passed to the directory service 460.

In operation 610, the enterprise device social media cloud 310 checks whether the user addition in the directory service 460 is successful. If the user addition is not successful, the process returns to operation 602 to restart the user creation process. If the user addition is successful, the enterprise device social media cloud 310 may receive policies and privileges associated with the newly created user from the directory service 460. The process then proceeds to operation 612.

In operation 612, the received policies and privileges are mapped to the user in the enterprise device social media cloud 310. These policies and privileges are derived from the directory service 460 and applied to the corresponding user in the device social network.

After the policies and privileges are mapped, the user is created in the enterprise device social media cloud 310 in operation 614 using the credentials that are used to call the directory service API. This user corresponds to the device that initiated the registration process, such as the laptop 512 or the HVAC device 342.

Finally, in operation 616, the mapped privileges are applied to the user in the enterprise device social media cloud 310. These privileges govern the user's access and permissions within the device social network.

Figure 7:
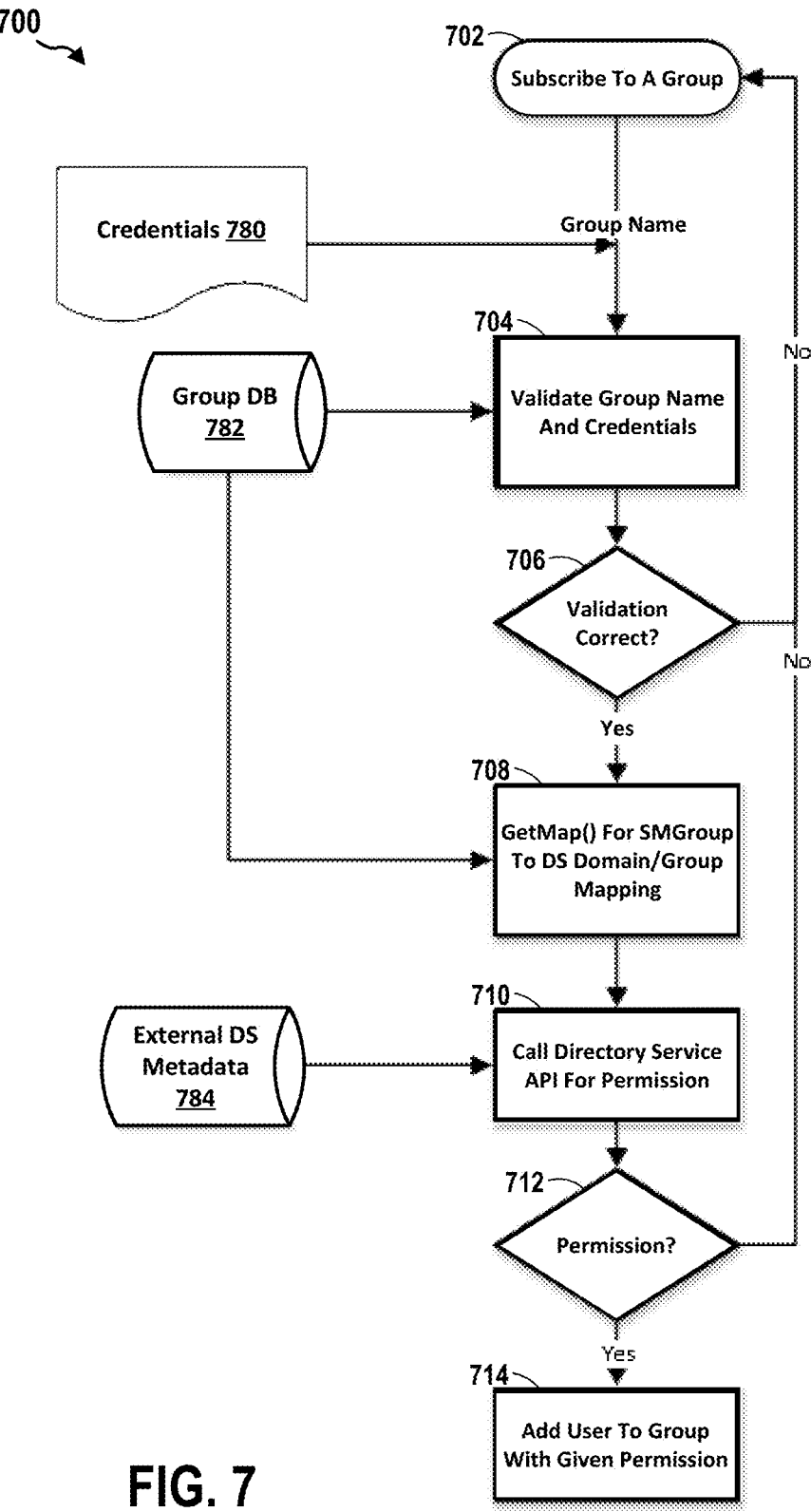
FIG. 7 is a flowchart illustrating a process for subscribing a device to a group within the enterprise device social media cloud and network.

FIG. 7 is a flowchart 700 illustrating a process for subscribing a device to a group within the enterprise device social media cloud and network. This process is handled by the user binding manager 444, which is responsible for managing the mapping between the device social network privileges, group memberships, and directory service domains.

In operation 702, a device, such as the laptop 512 or the HVAC device 342, attempt to subscribe to a group by providing its user credentials 780 and the desired group name to the enterprise device social media cloud 310.

In operation 704, the user binding manager 444 validates the provided group name and user credentials against the group database 782. The group database 782 contains information about the existing groups within the enterprise device social media cloud 310 and their corresponding mappings to the directory service domains.

In operation 706, the user binding manager 444 checks if the validation is correct. If the validation fails, the process returns to operation 702, where the device can attempt to subscribe to the group again with the correct information.

If the validation is successful, in operation 708, the user binding manager 444 retrieves, from the group database 782, the mapping between the device social media (SM) group and the directory service (DS) domain/group using the GetMap( ) function.

In operation 710, the user binding manager 444 calls the directory service API to request permission for the device to join the specified group. The user binding manager 444 passes the device's credentials and the desired group information to the directory service 460. The directory service 460 checks if the device has the necessary permissions to join the requested group based on the policies defined in the directory service 460. The directory service 460 may further make this determination based on data from the external DS metadata 784.

The directory service 460 processes the request and returns a response indicating whether the device is permitted to join the group. In operation 712, the user binding manager 444 checks this response to determine if the device has been granted permission.

If the device does not have the required permissions, the process returns to operation 702, where the device can attempt to subscribe to the group again, possibly with different credentials or to a different group.

If the device has the necessary permissions, in operation 714, the user binding manager 444 adds the device to the requested group with the given permission. The device is now a member of the group within the enterprise device social media cloud 310 and can interact with other devices in the same group according to the policies defined in the directory service 460.

Devices can only subscribe to groups within the enterprise device social media cloud 310 if they have the appropriate permissions as defined in the enterprise's directory service 460. The enterprise device social media cloud 310 maintains consistency with the enterprise's security and management practices.

While devices can be created and added to the device social network, their policies and permissions are not controlled by the device social network itself. Instead, these policies and permissions are derived from the enterprise's directory service 460. This approach allows the enterprise device social media cloud and network to integrate with the enterprise's existing infrastructure and management processes.

The user binding manager 444 manages the mapping between the device social network and the directory service 460. Devices are properly authenticated and authorized before they can join groups and interact with other devices within the enterprise device social media cloud 310.

The enterprise device social media cloud and network provides a unique solution for managing device groups and their associated policies within an enterprise. By using the existing directory services infrastructure, the enterprise device social media cloud and network establishes that device groups and their permissions are consistent with the organization's established security and management practices.

When a device, such as the laptop 512 or the HVAC device 342, requests to subscribe to a group in the enterprise device social media cloud 310, the request is processed by the user binding manager 444. The user binding manager 444 is responsible for managing the mapping between the device social network privileges, group memberships, and directory service domains.

Groups within the enterprise device social media cloud 310 may be preconfigured and have their policies defined by the directory service 460. This means that the policies governing device groups in the enterprise device social media cloud 310 are derived from the enterprise's existing directory service infrastructure. By maintaining this consistency, the enterprise device social media cloud establishes that device group policies align with the organization's overall security and management strategies.

If a device, whose credentials belong to a certain group in the directory service 460, attempts to subscribe to another group in the enterprise device social media cloud 310, it may be granted limited privileges. For example, an engineer's laptop, which is part of the engineering group in the directory service 460, may request to subscribe to an IT group in the enterprise device social media cloud 310. In this case, the engineer's laptop may be granted read-only privileges for the IT group, allowing it to view certain information but not send messages or modify settings.

This granular control over group permissions is achieved through the integration of the enterprise device social media cloud and network with the enterprise's directory service 460. The directory service 460 defines the policies and permissions for each group, and these policies are enforced within the enterprise device social media cloud 310. For instance, if the directory service 460 specifies that devices in the engineering group should have read-only access to the IT group, the enterprise device social media cloud 310 will enforce this policy when devices attempt to subscribe to the IT group.

Each group within the enterprise device social media cloud 310 may have an admin account that provides access to requesting entities. This admin account can be a human user or a device with elevated privileges. The admin account is responsible for managing group membership and permissions, such as approving or denying subscription requests and modifying group policies.

The process of granting access to a requesting entity can be automated or based on manual intervention. In an automated scheme, the user binding manager 444 can be configured to automatically approve or deny subscription requests based on predefined criteria, such as the requesting device's group membership in the directory service 460. Alternatively, in a manual intervention scheme, the admin account may review each subscription request and manually approve or deny access based on the organization's policies and the specific requirements of the requesting device.

Figure 8:
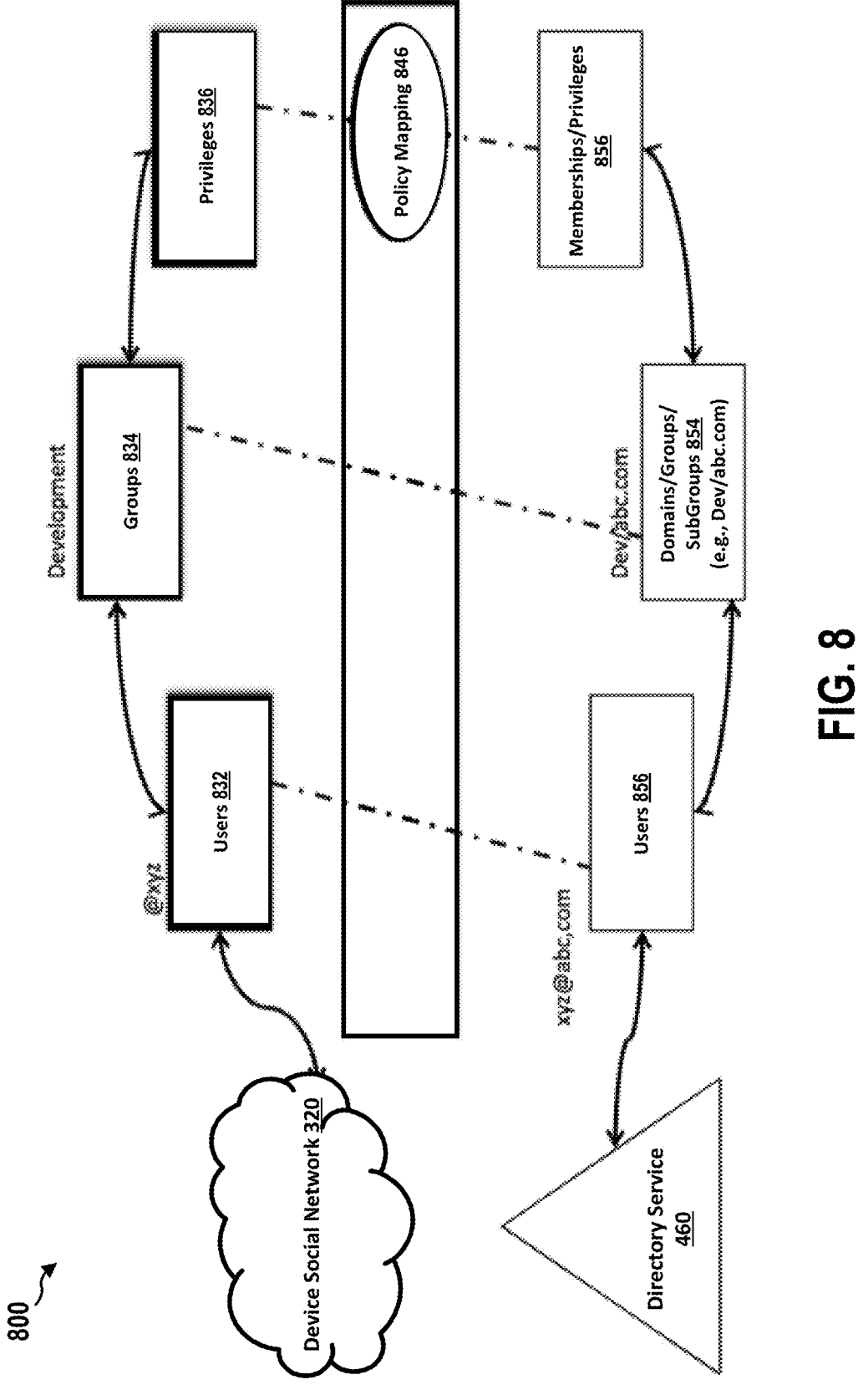
FIG. 8 is a diagram illustrating integration of a device social network with an enterprise directory service for managing user privileges and group memberships.

FIG. 8 is a diagram illustrating integration of a device social network with an enterprise directory service for managing user privileges and group memberships. This figure highlights the mapping and translation process between the device social network and the enterprise directory service.

In this diagram, the device social network 320 is connected to users 832 (e.g., @xyz) and groups 834 (e.g., Development). The groups 834 are associated with privileges 836, which define the access levels and permissions for the users within the groups. The enterprise directory service 460 is connected to users 852 (e.g., xyz@abc.com) and domains/groups/subgroups 854 (e.g., Dev/abc.com). The domains/groups/subgroups 854 are associated with memberships/privileges 856, which define the roles and permissions for the users within the directory service.

The enterprise device social media cloud 310 integrates with the enterprise's existing directory service 460 to manage device privileges and provide consistency with the organization's security policies. This integration involves mapping the device social network privileges to the corresponding privileges defined in the directory service 460.

In the device social network 320, the users 832 are represented by handles, such as "@xyz". These users 832 can belong to different groups 834, such as "Development," which have their own set of privileges 836. The privileges 836 in the device social network 320 include:

Administrator privilege: Users can post and view all data
Read-only privilege: Users can only view data
Restricted access: Users can only view certain "Public" data
No access The directory service 460 has its own set of users 852, domains 854, groups, subgroups, memberships, and privileges 856. Each user 852 in the directory service 460 is identified by a unique identifier, such as an email address (e.g., "xyz@abc.com"). Domains 854 are organizational units within the directory service 460 that can represent departments, locations, or other logical groupings. Groups and subgroups are collections of users 852 with common attributes or purposes. The privileges 856 in the directory service 460 include:

Administrators
Power Users
Guests
Read-only

To bridge the gap between these two systems, a mapping and translation layer 840, implemented by the policy mapping component 448, is responsible for establishing a correspondence between the device social network 320 privileges 836 and the directory service 460 privileges 856.

Privileges are managed through the policy mapping component 448, which serves as an API for handling requests related to privileges. Whenever a request is sent out, such as a broadcast request or a request to apply changes to the network, the policy mapping component 448 is invoked. It queries the directory service 460 to determine if the user associated with the request (e.g., "@xyz") has the necessary privileges within their domain to perform the requested operation.

The policy mapping component 448 communicates directly with the directory service 460 to verify if the user is allowed to perform the requested action. If the user does not have the required privileges, the enterprise device social media cloud 310 will prevent the user from performing the action.

The privileges in the enterprise device social media cloud 310 are derived from and mapped to the privileges defined in the directory service 460. This means that when privileges change in the directory service 460, the mapped privileges in the enterprise device social media cloud 310 change as well. The privileges in the enterprise device social media cloud 310 remain consistent with the organization's security policies defined in the directory service 460.

The user binding manager 444 works in conjunction with the policy mapping component 448 to enforce the appropriate privileges for each user and device in the enterprise device social media cloud 310. More specifically, the user binding manager 444 is responsible for setting up the privileges and maintaining the mapping between the device social network 320 and the directory service 460. When a device attempts to perform an action within the device social network 320, such as sending a message or applying changes to the network, the user binding manager 444 will consult the policy mapping component 448 to determine if the device has the necessary privileges to perform the requested action.

The policy mapping component 448 queries the directory service 460 to check if the user associated with the device has the required privileges 856 within the corresponding domain 854. If the user does not have the necessary privileges 856, the device social network 320 will reject the action and send a response indicating that the user is not allowed to perform the requested operation.

For example, if a rogue device attempts to join the network by changing its identifier to mimic a legitimate device (e.g., @Bob-Laptop), the authentication process will fail because the device lacks the necessary credentials, such as the username and password, which are managed by the directory service 460. The mapping between the device social network handles and the directory service accounts. Only authenticated devices can participate in the network.

To improve performance and reduce the need for frequent communication with the directory service 460, the privileges information may be cached in the mapping and translation layer 840. This caching mechanism allows the user binding manager 444 to quickly determine a user's privileges without having to query the directory service 460 for every action.

The integration of the device social network 320 with the directory service 460 through the mapping and translation layer 840 provides authentication and role-based control privileges for all intelligent devices, enabling them to be part of the enterprise device social media network 320. This system prevents unauthorized access or impersonation attempts by rogue devices, as the policies and mappings are clearly defined and enforced by the directory service 460. This system provides consistent management of device privileges across the enterprise. The device social network 320 adheres to the organization's security policies.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operation of an enterprise device social media cloud, comprising:

receiving, at the enterprise device social media cloud, a request from a device to join a device social network supported by the enterprise device social media cloud, wherein the request comprises a user packet including:

a network social name, wherein the network social name comprises a social media handle for identifying the device within the device social network, enterprise credentials of the device, and device information metadata;

validating, by the enterprise device social media cloud, the user packet;

when the validation is successful, calling a directory service application programming interface (API) to create a directory service user entry corresponding to the device in the directory service;

when the creation of the directory service user entry is successful:

receiving, from the directory service, policies and privileges associated with the directory service user entry;

establishing, by a user binding manager of the enterprise device social media cloud, a user binding that associates the social media handle with the directory service user entry;

mapping the policies and privileges to a device social network user in the enterprise device social media cloud; and creating the device social network user corresponding to the device in the enterprise device social media cloud, wherein the device social network user is identified by the social media handle and operates according to the mapped policies and privileges.

2. The method of claim 1, further comprising:

receiving, at the enterprise device social media cloud, a request from the device to subscribe to a group in the device social network, wherein the request includes the enterprise credentials of the device and a group name;

validating the enterprise credentials;

when the validation of the enterprise credentials is successful:

obtaining a mapping between the group in the device social network and a group in the directory service;

calling the directory service to request permission for the device to join the group in the directory service; and when the device has the permission, adding the device to the group in the device social network.

3. The method of claim 1, further comprising:

applying the mapped policies and privileges to the device social network user in the enterprise device social media cloud.

4. The method of claim 3, wherein mapping the policies and privileges comprises:

mapping social network privileges in the device social network to corresponding privileges in the directory service, wherein the social network privileges include at least one of:

an administrator privilege allowing a user to post and view all data, a read-only privilege allowing a user to only view data, a restricted access privilege allowing a user to only view public data, and a no access privilege; and wherein the corresponding privileges in the directory service include at least one of:

an administrator privilege, a power user privilege, a guest privilege, and a read-only privilege.

5. The method of claim 4, further comprising:

caching, by the enterprise device social media cloud, the mapped policies and privileges; and using the cached mapped policies and privileges to control actions of the device in the device social network without querying the directory service for each action.

6. The method of claim 3, further comprising:

receiving, at the enterprise device social media cloud, a request from the device to perform an action in the device social network;

querying the directory service to determine if the device has a privilege to perform the requested action based on the mapped policies and privileges; and rejecting the request when the device does not have the privilege to perform the requested action.

7. The method of claim 1, wherein the device information metadata includes at least one of:

a serial number of the device, a device type of the device, a make of the device, and a model of the device.

8. The method of claim 1, wherein the enterprise device social media cloud comprises:

a user manager configured to bind device social network users to the directory service;

the user binding manager configured to maintain a mapping between device social network privileges and directory service privileges; and a notification manager configured to route notifications as at least one of a public notification from an administrator group and a localized peer-to-peer notification based on user membership.

9. The method of claim 1, wherein the directory service is one of:

Active Directory, and a Lightweight Directory Access Protocol (LDAP) server.

10. The method of claim 1, wherein the enterprise device social media cloud is an on-premises cloud.

11. The method of claim 1, wherein the device social network is a private network internal to an enterprise.

12. A computer system in an enterprise device social media cloud, comprising:

a processor; and a memory coupled to the processor, wherein the processor is configured to:

receive a request from a device to join a device social network supported by the enterprise device social media cloud, wherein the request comprises a user packet including:

a network social name, wherein the network social name comprises a social media handle for identifying the device within the device social network, enterprise credentials of the device, and device information metadata;

validate the user packet;

when the validation is successful, call a directory service application programming interface (API) to create a directory service user entry corresponding to the device in the directory service;

when the creation of the directory service user entry is successful:

receive, from the directory service, policies and privileges associated with the directory service user entry;

establish, by a user binding manager of the enterprise device social media cloud, a user binding that associates the social media handle with the directory service user entry;

map the policies and privileges to a device social network user in the enterprise device social media cloud; and create the device social network user corresponding to the device in the enterprise device social media cloud, wherein the device social network user is identified by the social media handle and operates according to the mapped policies and privileges.

13. The computer system of claim 12, wherein the processor is further configured to:

receive a request from the device to subscribe to a group in the device social network, wherein the request includes the enterprise credentials of the device and a group name;

validate the enterprise credentials;

when the validation of the enterprise credentials is successful:

obtain a mapping between the group in the device social network and a group in the directory service;

call the directory service to request permission for the device to join the group in the directory service; and when the device has the permission, add the device to the group in the device social network.

14. The computer system of claim 12, wherein the processor is further configured to:

apply the mapped policies and privileges to the device social network user in the enterprise device social media cloud.

15. The computer system of claim 14, wherein to map the policies and privileges, the processor is further configured to:

map social network privileges in the device social network to corresponding privileges in the directory service, wherein the social network privileges include at least one of:

an administrator privilege allowing a user to post and view all data, a read-only privilege allowing a user to only view data, a restricted access privilege allowing a user to only view public data, and a no access privilege; and wherein the corresponding privileges in the directory service include at least one of:

an administrator privilege, a power user privilege, a guest privilege, and a read-only privilege.

16. The computer system of claim 15, wherein the processor is further configured to:

cache the mapped policies and privileges; and use the cached mapped policies and privileges to control actions of the device in the device social network without querying the directory service for each action.

17. The computer system of claim 14, wherein the processor is further configured to:

receive a request from the device to perform an action in the device social network;

query the directory service to determine if the device has a privilege to perform the requested action based on the mapped policies and privileges; and reject the request when the device does not have the privilege to perform the requested action.

18. The computer system of claim 12, wherein the device information metadata includes at least one of:

a serial number of the device, a device type of the device, a make of the device, and a model of the device.

19. The computer system of claim 12, wherein the enterprise device social media cloud comprises:

a user manager configured to bind device social network users to the directory service;

the user binding manager configured to maintain a mapping between device social network privileges and directory service privileges; and a notification manager configured to route notifications as at least one of a public notification from an administrator group and a localized peer-to-peer notification based on user membership.

20. A non-transitory computer-readable medium storing instructions which, when executed by a processor of a computer system in an enterprise device social media cloud, cause the computer system to:

receive a request from a device to join a device social network supported by the enterprise device social media cloud, wherein the request comprises a user packet including:

a network social name, wherein the network social name comprises a social media handle for identifying the device within the device social network, enterprise credentials of the device, and device information metadata;

validate, by the enterprise device social media cloud, the user packet;

when the validation is successful, call a directory service application programming interface (API) to create a directory service user entry corresponding to the device in the directory service;

when the creation of the directory service user entry is successful:

receive, from the directory service, policies and privileges associated with the directory service user entry;

establish, by a user binding manager of the enterprise device social media cloud, a user binding that associates the social media handle with the directory service user entry;

map the policies and privileges to a device social network user in the enterprise device social media cloud; and create the device social network user corresponding to the device in the enterprise device social media cloud, wherein the device social network user is identified by the social media handle and operates according to the mapped policies and privileges.

* * * * *